United States Patent
Canora et al.

(10) Patent No.: US 9,367,852 B2
(45) Date of Patent: Jun. 14, 2016

(54) MANAGING EXPERIENCE STATE TO PERSONALIZE DESTINATION VISITS

(75) Inventors: David J. Canora, Winter Garden, FL (US); Christopher James Purvis, Estacada, OR (US); Brian J. Wilson, Clermont, FL (US)

(73) Assignee: Disney Enterprises, Inc., Burbank, CA (US)

(*) Notice: Subject to any disclaimer, the term of this patent is extended or adjusted under 35 U.S.C. 154(b) by 1022 days.

(21) Appl. No.: 13/092,370

(22) Filed: Apr. 22, 2011

(65) Prior Publication Data

US 2012/0271834 A1    Oct. 25, 2012

(51) Int. Cl.
| | | |
|---|---|---|
| *G06F 17/30* | (2006.01) | |
| *G06F 17/00* | (2006.01) | |
| *G06Q 20/04* | (2012.01) | |
| *G06Q 10/06* | (2012.01) | |
| *A63F 13/40* | (2014.01) | |
| *G06Q 30/02* | (2012.01) | |

(52) U.S. Cl.
CPC ..................................... *G06Q 30/02* (2013.01)

(58) Field of Classification Search
CPC ............ G06F 3/0487; G06F 17/30241; G06F 17/3087; G06F 17/30554; G06F 17/30864; G06F 17/30867; G06F 2203/04808; G06F 3/005; G06F 3/041; G06F 3/0482; G06F 3/0484; G06F 3/04883; G06F 17/00; G06F 17/30023; G06F 17/30247; G06F 17/30265
USPC ........................................... 707/899; 705/5, 6
See application file for complete search history.

(56) References Cited

U.S. PATENT DOCUMENTS

| | | | |
|---|---|---|---|
| 7,212,983 B2* | 5/2007 | Redmann et al. ................. | 705/6 |
| 8,200,515 B2* | 6/2012 | Natsuyama et al. .............. | 705/5 |

* cited by examiner

*Primary Examiner* — Yicun Wu
(74) *Attorney, Agent, or Firm* — Marsh Fischmann & Breyfogle LLP; Kent A. Lembke

(57) ABSTRACT

A method for managing distribution of entitlements, such as personalized or enhanced experiences at a destination such a theme park. The method includes receiving a request for experience state management from an experience system that defines an experience provided by the experience system and identifies a single or multiple visitors. The method includes accessing an experience state associated with the identified visitors. The experience state defines experiences the visitor is entitled to receive and a ranked or prioritized listing of these experiences. The method includes responding to the experience system indicating whether the visitor is eligible to receive the defined experience based on their experience state and, when there are two or more eligible visitors, arbitrating amount the members of this eligible group. A feedback loop causes the experience states to be updated to modify the prioritized listings and to update an experience history for use in later arbitrations.

18 Claims, 4 Drawing Sheets

MANAGING EXPERIENCE STATE TO PERSONALIZE DESTINATION VISITS

BACKGROUND

1. Field of the Description

The present description relates, in general, to systems and methods for personalizing experiences of a destination such as a theme park, a sporting event or concert, or a shopping mall, and, more particularly, to a method of managing experience state for people visiting a destination, which includes a number of venues or locations at which experience mechanisms/systems are used to generate personalized experiences, so as to better control the experience mechanism/system (which may be a scarce resource not available to all visitors) to more effectively personalize each person's visit to the destination.

2. Relevant Background

Operators of destination facilities (or simply "destinations") are continuously searching for ways to attract more visitors and to enhance each visitor's enjoyment while at their destination. To this end, many destinations have added more and more opportunities to offer personalization and exclusive experience enhancements to visitors.

For example, a stadium hosting a game attended by thousands of fans may personalize the visit for a select number of the fans by announcing their names or displaying their images on a large screen. The personalized recognition makes the fan receiving the experience feel special and provides a memorable visit that they may wish to repeat.

Similarly, a theme park may use technology such as visual recognition, an RFID reader that reads a token or card, or the like to identify visitors and then personalize their visit or provide them an additional experience not provided to others. For example, a park visitor may carry a card or badge with a bar code, magnetic strip, an RFID tag, or other identifier, and a reader may be used to identify the visitor as being near a particular venue or location within the park such as near the location of an actor or character or in a vehicle on a ride.

Using this identification information, the visitor's profile or information may be retrieved from a database such as to determine it is the visitor's birthday, to determine their first name and/or home town, and find out whether they have paid for or otherwise are entitled to any preferred or enhanced experiences while at the park. Then, the identified visitor may have their visit personalized. This may include having their name or home town called out or displayed, the birthday song may be played with the person's first name substituted into the audio track, a character may greet the visitor by name, display screens may display their image with or without transformations (e.g., change their image into a princess, a pirate, a ball player, a movie character, and so on), or provide other personalized or enhanced experiences.

While personalization of visits is highly effective in enhancing enjoyment of a destination, a destination is typically limited on the number or amount of such experiences it can effectively provide its visitors. For example, an amusement park ride may be able to call out one hometown or rider's name per vehicle passing past a personalization device (or experience-generating system). This may result in a large fraction of the riders feeling left out or disappointed (e.g., thousands may ride a particular ride and only a few hundred may benefit from personalization).

As will be appreciated, the opportunities and devices used for personalizing or providing exclusive experiences are limited, and there is a need for managing these opportunities and devices as scarce resources to more fairly or at least purposively dole out the personalized or exclusive experiences. Destinations presently are typically operated so as to provide such experiences simply on a first-come-first-served basis or on a random basis. There remains a need for a system and method for managing the distribution of personalization and exclusive experience enhancements at destinations, which may range from theme parks or similar destinations to shopping destinations to facilities hosting concerts, plays, movies, sporting events, and the like.

SUMMARY

The present invention addresses the above problems by providing a method (and corresponding systems) for managing the distribution of personalization and exclusive experience enhancements. The experience state management method includes tracking which personalization or experiences visitors to a destination (e.g., an amusement park, a shopping mall, a facility hosting an sporting event, concert, or the like, or other destination visited by large numbers of people) are entitled to participate in or to receive.

The method also includes prioritizing or ranking these personalizations or experiences on an individual basis and storing such an individual, ranked list in memory or data storage, and these rankings may vary among individuals and change over the length of a visit to a destination. For example, a first child at an amusement park may have an experience/personalization list (or entitlement list) that is initialized to rank a pirate experience above a character interaction experience while a second child may have an entitlement list that is initialized in the opposite manner with the character interaction experience ahead of the pirate experience. The list may be updated as the children (or visitors) receive the personalizations/experiences on their list. In the above example, the first child may be provided a pirate experience, and the method includes updating their entitlement list to rank the character interaction above another pirate experience.

In addition, the method involves arbitrating the delivery or providing of experiences or personalizations when two or more visitors are in a delivery zone/area about or proximate to an experience/personalization system (e.g., a station on a ride that personalizes the ride, a display that provides visual/audio output to provide a personalized or enhanced experience, a character that is instructed to personalize a greeting to a visitor and/or to interact with that particular visitor, a screen used to personalize an advertisement to a shopper, and so on). In the above example after the individual experience state has been updated, the two children will both have character interaction as their highest priority (or highest ranked) experience/personalization in their tracked experiences states.

The method may include choosing one of these two children to receive a character interaction when there is a "tie" in that they are both eligible and are near a character (in this example, the character is "an experience delivery system"). The arbitration may be performed by an event processor based on a variety of business rules such as choosing the second child because the first child has received one more of their entitlements (e.g., the pirate experience) or other factors (such as choosing the younger child, selecting the child who is identified as a preferred customer/visitor, performing a random selection between the two eligible visitors, and so on).

After the experience is provided, a feedback loop or step is performed to update the recipient's managed experience state (to reprioritize or rank their experiences to lower the character interaction and indicate they have received one such experience) and, in some cases, to update the non-recipient's managed experience state (to indicate or track that they missed a character interaction (or experience/personalization) for which they were eligible as this may be a factor for use in a later arbitration). With these and other steps, the experience state management method better ensures that visitors receive the personalizations and experiences to which they are entitled. The method also allows the destination operator (or experience provider) a way to manage and maximize its finite resource of available opportunities for personalization/enhanced experiences.

More particularly, a method is provided for more fairly or effectively managing distribution of entitlements, such as personalized or enhanced experiences at a destination such a theme park. The method may be implemented by a computer-based system operating within the destination's facilities, and the method may include, with an event processor (e.g., software run by a computer processor), receiving a request for experience state management services from an experience system (such as a mechanism at a venue for personalizing or enhancing an experience). The request defines an experience provided by the experience system (e.g., a display of "Happy Birthday, Kathy!!," a display of a modified image of a visitor to look like a character from a movie, or the like), and the request also includes an identifier for a visitor.

The method further includes, with the event processor, accessing an experience state associated with the identified visitor. The experience state, which may be a file or record in memory, may include a set of eligible experiences and a ranked order for receiving the eligible experiences. Further, the method includes, with the event processor, generating a response to the experience system indicating whether the visitor is eligible to receive the defined experience based on the set of eligible experiences in the experience state. Then, in response to feedback relative to distribution of the defined experience to the visitor, operating the event processor to update the experience state to modify the ranked order. The modifying of the ranked order may include lowering a ranking of the defined experience relative to other of experiences in the set of eligible experiences when the feedback indicates the defined experience was distributed to the visitor. Then, the method may include updating an experience history to increase a count of a number of times the visitor has received the defined experience. Additionally, the modifying of the ranked order may include providing a historical indication that the visitor missed an opportunity to receive the defined experience when the feedback indicates the defined experience was not distributed to the visitor.

In some embodiments, it may be useful to manage groups of two or more visitors. In such cases, the request may further provide an identifier for a second visitor. Then, the method may include accessing an experience state for the second visitor including a set of eligible experiences and a ranked order for the set of eligible experiences for the second visitor. In this case, the generating of the response includes arbitrating between the first and second visitors to select a recipient for the defined experience. Additionally, the arbitrating may be performed based on comparing the ranked orders such that the selected recipient had the defined experience as a higher priority experience. In some cases, the arbitrating is performed based on a set of business rules when the defined experience is equally ranked in the ranked orders. Then, the set of business rules may include selecting a visitor among visitors equally ranking an experience (when the ranking is a "tie") that has an experience history indicating a lower number of times receiving the defined experience (e.g., give experience to a visitor that has yet to receive the experience over one that has and so on).

In either of the above embodiments, the ranking and prioritization may be performed upon demand. In other words, the invention is not limited to accessing pre-calculated rankings. In many applications, the calculations useful for generating the ranked orders are performed in real time to meet a particular need or demand.

DETAILED DESCRIPTION

The following description is directed to systems and methods for managing experience state for a destination, such as an amusement park, a cruise ship, a shopping mall, or the like, to more fairly or more purposively (e.g., to suit an operator's business goals) distribute scarce, or at least limited, opportunities to personalize or enhance visitors' experiences while visiting the destination. The method tracks what personalizations and experiences ("entitlements") each visitor is entitled to, which entitlements they have done, received, or experienced, and, in some cases, other information that may be useful in arbitration decisions (e.g., length of time at the destination, whether they have previously been passed over for an entitlement to which they were eligible, where in the destination they have been, and so on).

The method (and a system implementing such a method) then involves applying rules to create a prioritized or ranked list of potential personalizations/experiences for each visitor, and the list may indicate the order in which their entitlements should be provided (e.g., "should they receive the birthday personalization or the princess experience next?"). Venues with experience systems (or the experience systems themselves) may function to identify one or more visitors that are eligible for the experience(s) that they can provide. The venues may then issue a request to a state management system (or state machine) that may present this list of eligible visitors (e.g., a list of visitor identifiers or IDs) and the experiences which their experience system can provide. The method then continues with the state machine (or its event processor) acting to determine which visitor should receive the experiences/personalizations and in which order.

If more than one visitor identifier is provided and these visitors each include the available experiences on their ranked list, the event processor functions to arbitrate among the visitors, and the response provided to the venue or experience system includes a ranking of the visitors defining the order in which they should receive the experience (e.g., if the experience system can provide one experience, such as when a ride vehicle is passing a point in a ride, a top ranked visitor will be provided the experience but if two or more experiences can be provide the top two or more visitors will receive the experience (possibly in their ranked order)).

Figure 1:
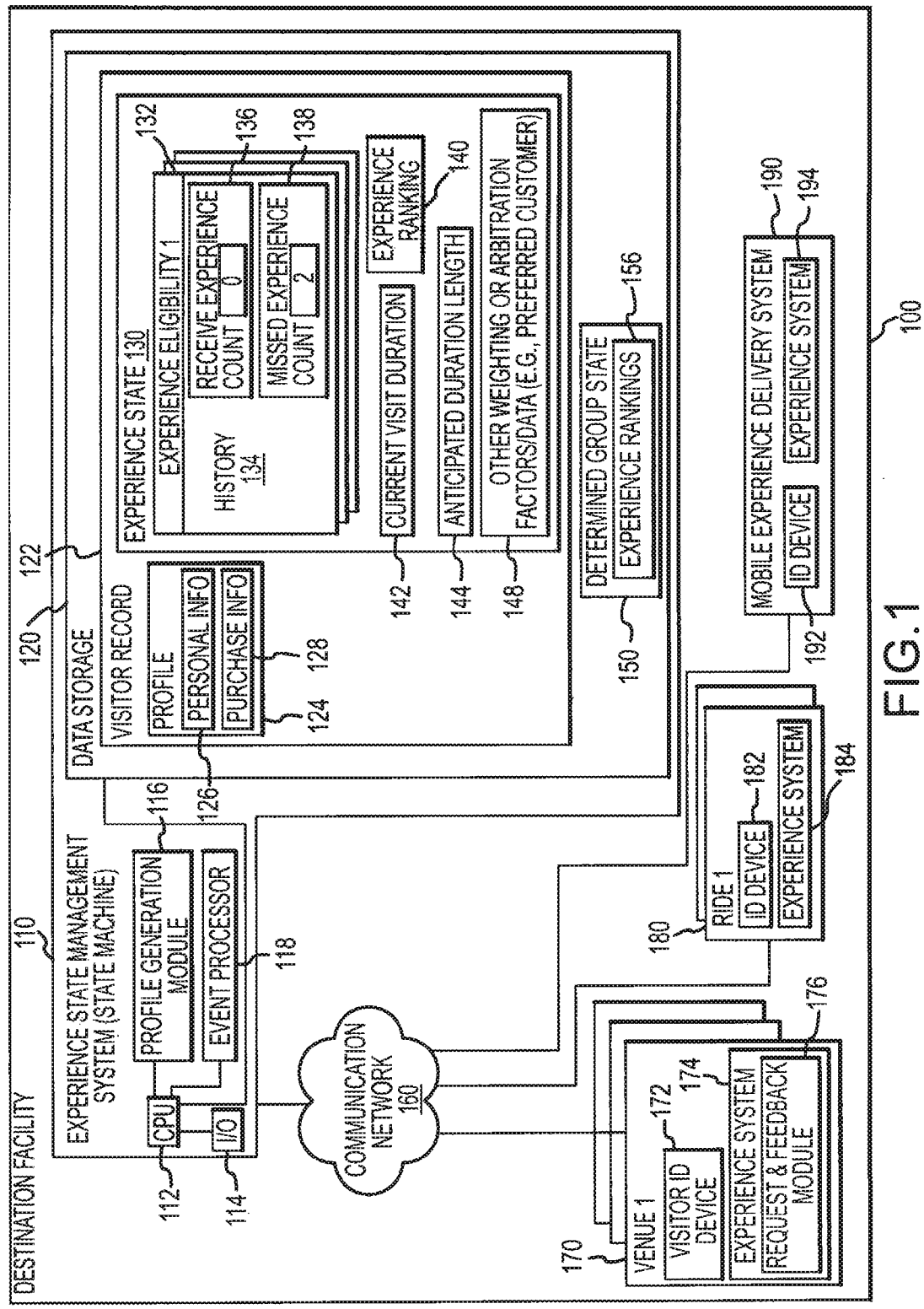
FIG. 1 is a functional block drawing of a destination such as an amusement park or the like that is configured to carry out the experience state management methods described herein with an experience state management system and a number of experience delivery/generation stations or systems.

FIG. 1 illustrates with a functional block diagram a destination facility 100 that may operate to implement the experience state management method described herein to better distribute entitlements (e.g., experience personalizations, enhancements, and/or the like) to its visitors (not shown). The destination facility or destination 100 may take the form of nearly any building, structure, or location that is visited by numerous visitors such as an amusement park, an event facility, a shopping mall, a retail store, a cruise ship, or the like. Each of these types of destinations 100 may include a number of devices or stations (or even live actors acting in response to enhancement/personalization delivery instructions) that are used to personalize or enhance a visitor's visit to the destination 100.

For example, the facility 100 may include a number of venues 170, rides 180, and/or mobile experience delivery systems 190 (e.g., live actors, robotic devices, and so on that may move about the facility 100). The venues 170, 180, and 190 may each include an experience generation/delivery system 174, 184, 194 that may function to personalize or enhance a visitor's experience. For example, a television or monitor may be operated to display information to a particular visitor (e.g., show their name, present a greeting or message (e.g., "Happy Birthday, Brian" or "You're a Real Pirate, Dave!"), show their image with or without modifications, and so on) or a character may personalize a greeting to a particular visitor.

To assist in such personalization, the venues 170, rides 180, and mobile systems 190 each include a visitor ID device 172, 182, 192 (or are associated with such a device/mechanism). Numerous techniques may be used to identify visitors of the destination 100, and this description is not limited to any particular one of these techniques. For example, the ID devices 172, 182, 192 may include visual recognition devices to identify each or select ones of the visitors. In other cases, the visitors may identify themselves such as by swiping a card with a bar code, a magnetic strip, or the like, by entering their identifying information into a touch screen, or by simply speaking their name. In many cases, each visitor will be provided a token with a readable chip or tag such as an RFID tag and the device 172, 182, 192 may include an RFID reader such that the visitor's ID information can readily be retrieved from a visitor database (not shown).

Each of the experience systems 174, 184, 194 may include a request and feedback module as shown with module 176. The request and feedback module 176 operates to communicate (in a wired or wireless manner) a request over communication network 160 to an experience state management system (or state machine) 110. The request typically will include at least a set of identifiers for visitors identified by the ID device 172 (or 182, 192) as being within the delivery/experience zone of the venue 170 (or ride 180 or mobile system 190) and may also include an identifier for the venue 170 (or ride 180 or mobile system 190) that can be used to determine what experiences/personalizations the requesting venue provides or may include a listing of these available experiences/personalizations (e.g., the method includes a step of determining one or more available entitlements or experiences/personalizations that can be presently provided to one or more identified visitors). The visitors identified in the request may number from one to several visitors to many visitors (e.g., 1 to 10 may be a common number of identified visitors with some groups being much larger in number).

Significantly, the facility 100 includes an experience state management system 110 in wired or wireless communication (such as via a communications network 160 that may include a WAN, a LAN, or the like) with the experience systems 174, 184, 194 to receive the request for state management services. The management system 110 may take the form of one or more computer systems or computer-type devices. With this in mind, the state management method described herein is typically implemented with a combination of hardware and software (e.g., with programs or code that is configured to cause one or more computers to perform particular functions such as processing state management requests, determining which visitors should receive an entitlement (which may include arbitrating steps), generating and transmitting a response to the experience systems 174, 184, 194, and updating individual experience state records/files to show received and missed entitlements and other arbitration-relevant information (how long at destination, preferred customer, visitor expected to return for additional visits, and so on)).

To this end, the management system 110 is shown to include a processor(s) 112 that is adapted (such as with an operating system) to run software such as a profile generation module 116 and an event processor 118. The CPU 112 also manages input/output (I/O) devices 114 such as keyboards, touchscreens, a mouse, a monitor/display, and communication devices for receiving/transmitting messages (requests, responses, and so on). The I/O devices 114 may be used by an operator to view ongoing processes such as experience states and to update or change arbitration rules or experience states.

For example, the operator may change arbitration rules based on data mining that may indicate that entitlements have not been distributed as desired (e.g., experiences were being provided in a too concentrated manner to a small fraction of visitors, experiences were not being delivered to preferred customers as often as desired, and due to other business rules/goals). In other cases, the I/O devices may be used to alert operators of the management system 110 when a visitor is about to leave a facility 100 without receiving one or more experiences (which they may have purchased the entitlement to), and the operator may the take proactive steps to try to provide the visitor with the experience or to take later steps to make up for the missed opportunity (send the visitor a free pass or gift).

The management system 110 includes memory or data storage (such as a server(s) or the like) 120 that is managed by the CPU 112 to store visitor records or files 122 for each tracked/managed visitor of the destination. The system 110 includes a profile generation module 116, and the module 116 may function to create a visitor profile 124 for each of these tracked visitors. The visitor profile 124 may include personal information 126 such as their name (e.g., for use in personalizing an experience by announcing their name or greeting them by name), their photograph (e.g., for personalizing experience with their image), their address (e.g., for personalizing an experience by calling out their hometown), their birth date (e.g., for enhancing an experience by celebrating their birthday), and/or whether they have earned a special status (e.g., a repeat visitor, a preferred customer, and so on). The personal information 126 or another part of the profile 124 may include an identifier for the visitor, which can be used to track or index their experience state or otherwise identify them to an experience system 174, 184, 194 (e.g., a unique number or the like assigned to the visitor). The profile 124 may also include purchase information 128 such as whether they have purchased one or more rights to receive an enhanced experience such as a pirate or princess experience) or have paid more to be treated as a preferred customer.

The state management system 110 also includes an event processor (or state management software module) 118 that is run by CPU (or on the OS of CPU) 112 that generates and manages an experience state record/file 130 for each of these tracked/managed visitors to destination 100. The experience state 130 includes one or more entitlements (e.g., a listing of what experiences/personalizations for which the visitor identified by provide 124 is entitled to receive) 132. For example, the experience eligibilities 132 may include all experiences available at the destination 100 or a subset of such available experiences. The entitlements 132 may also include personalized experiences such as when the visitor is visiting on their birthday or wedding anniversary. The entitlements 132 may also include enhanced experiences for which access has been purchased (or is part of purchased ticket) such as a pirate experience, a dinosaur or wild animal enhancement, or the like.

A history 134 may be associated with these entitlements 132 (or otherwise be tracked for the visitor) that may be used in later arbitrations or decisions regarding which of two or more visitors should next receive an experience or personalization. For example, the history 134 may include a count of the number of times the visitor has received an entitlement or missed an opportunity when eligible (e.g., another visitor in a group was chosen over them at a venue 170, on a ride 180, or in the presence of mobile system 190) as shown at 136, 138.

The event processor 118 acts to rank or prioritize these entitlements 130 and stores this ranking or list of prioritized entitlements at 140 (e.g., the rankings may place purchased experiences over free ones for an individual or personalizations such as a special day coinciding with their visit over experiences provided to all). These rankings may be performed by the event processor 118 based on a set of initial ranking rules (not shown) that may be stored in memory 120. Further, the data storage/memory 120 may also store a set of arbitration rules that will be used by the event processor 118 in processing requests from the experience systems 174, 184, 194 to generate a response that indicates the order in which visitors should receive a distributed experience/personalization. As discussed above, the ranking rules and arbitration rules may be periodically updated based on a feedback loop/process to allow the system to learn and better serve the needs of the operator of the destination 100. Potential arbitration rules/weightings are discussed in more detail below, but the specific rules used are not limiting to the invention with the more important aspect being that the event processor 118 functions to arbitrate between two or more deserving/entitled visitors to identify for the venue 170, ride 180, and/or mobile system 190 which visitor is to receive an experience/personalization.

The arbitration rules used by the event processor 118 may call for use of other data to be used in making visitor selection, and such data may be stored in the experience state 130 (or profile 124) for the visitor. The length of the visitor's current visit at the destination may be stored in memory 120 at 142, and this may be used to decide which visitor should receive an experience/personalization. For example, a request from venue 170 may identify two visitors that have an equal priority or ranking for an experience, and the event processor 118 may compare their current visit durations 142 and determine the one that has been at the destination 100 longer should receive the next experience.

Similarly, many destinations have visitors that stay for varying numbers of hours or days, and the remaining amount or length of a visitor's visit at destination 100 may be stored at 144 in memory for use in arbitration (e.g., an experience may be distributed to the visitor with the shortest remaining duration to their visit such as the last/only day of their visit as compared to another visitor who has one, two, or more days remaining (or vice versa to award a multiple day pass customer)).

The experience state 130 may also store other weighting/arbitration factors 148 for use by the event processor 118 such as whether the visitor is a preferred customer (e.g., repeat visitor, the paying member of a group/family, and so on), and these factors may be used during arbitration at any point in the process (a preferred customer may be ranked higher always or be placed behind a visitor who has "missed" a preset number of chances and so on).

As discussed above, the requests from the experience systems 174, 184, 194 may identify two or more potential visitors for receiving an entitlement. These may be handled by the event processor 118 as a group or set, and the event processor 118 may act to determine a group state 150 that it stores in memory 120 (at least temporarily and then sends to the requesting experience system). The group states 150 will typically include a determined set of experience rankings that is made up of a combined listing of the entitlements of the group's members (or at least those entitlements relevant to the requesting venue, ride, or mobile system 170, 180, 190).

For example, four visitors may gather around an experience system 174 at a venue 170. The venue's ID device 172 may identify these four visitors, and this ID information is provided in a state management service request sent to the state machine 110. The event processor 118 may then act to determine that all four visitors (or a lesser number) are entitled to receive the experience/personalization provide by experience system 174 and then generate a ranked/prioritized listing of the visitors with regard to the entitlement. The response to the venue 170 or experience system 174 would then provide this listing/ranking defining the order in which the visitors are to receive the experience/personalization at the venue 170. The experience system 174 would then use the request and feedback module 176 to transmit a message/communication indicating which visitors received the experience/personalization such that the event processor 118 can update the experience states 130 of the individuals in the group. This updating may include updating the history 134 to increase the count 138 for those who did not receive the entitlement, updating the history 134 to increase the count 136 for those who received the entitlement, and updating the individual rankings 140 (e.g., lowering the experience/personalization 132 for those who did receive it).

With the above system 110 for managing experience state understood, it may now be useful to explain the concepts of the operation of this system with a number of working examples. First, the system 110 may be used to manage individual experience states (e.g., records/files 130 in FIG. 1). Each visitor may be eligible for experiences and personalizations such as celebrations (e.g., their birthday) and paid-for experience enhancements. Based on a set of business rules (individual ranking rules), the list of personalizations/enhanced experiences are ranked (as shown at 140 of FIG. 1). The event processor 118 can inspect the ranking 140 and provide a requestor with the highest ranking personalization/enhanced experience that is supported at the requesting location (or by its experience delivery mechanism or system). The entitlements provided by each experience system may vary and, as a result, the response may not be the individual's highest ranked entitlement but instead the highest one, two, or more provided by the requesting venue/experience system.

Figure 2:
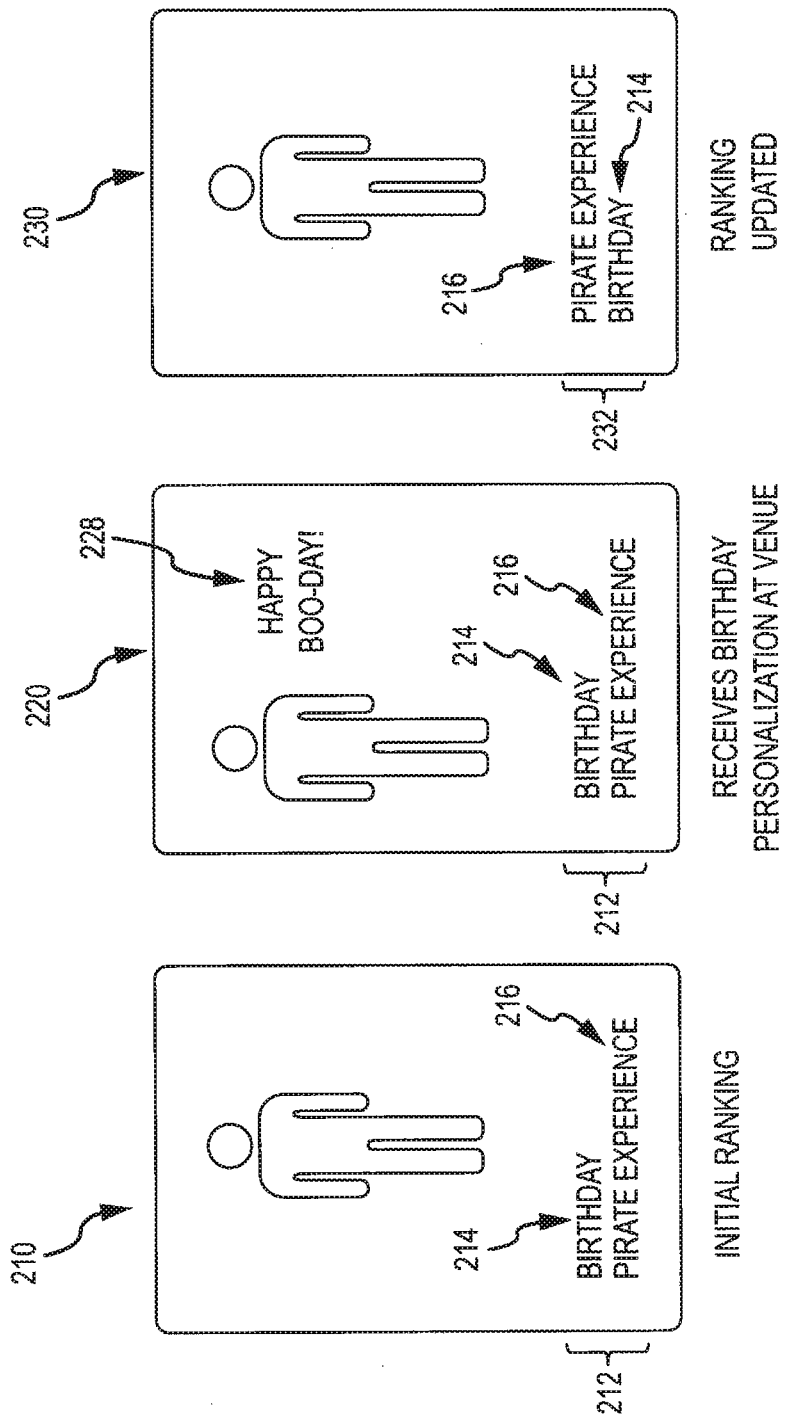
FIGS. 2A-2C schematically illustrate an individual's experience state at various stages of an experience management process, such as may be provided in the destination of FIG. 1 with its state management system.

For example, FIG. 2A illustrates an experience state 210 that may be managed by an event processor for a particular visitor. The event processor has functions to create a ranking or prioritized listing 212 of experiences/personalizations 214, 216 for which the visitor is entitled to receive during their visit at a destination. The experiences/personalizations 214, 216 may have been paid for by the visitor (such as the pirate experience or enhanced experience 216) or selected from a group of available experiences at the destination (e.g., one visitor may choose a princess experience and not a wizardry experience while another visitor may choose all animal-based experiences but not any involving robots and so on). Each visitor's experiences/personalizations 214, 216 may differ in their makeup. Personalizations 214 may also be included, which may be paid-for, selected, or automatically provided based on profile information (such as first name, home town, birth date, and so on).

The event processor arranges these experiences/personalizations into an initial ranking/prioritized listing 212 (e.g., personalization 214 ahead of an enhanced experience 216 or the like). The event processor may use a set of business rules to perform this initial ranking, and these rules may be changed over time by the operator of the system (such as to suit a particular business goal). For example, the initial ranking may be to place paid-for experiences toward the top of the list 212 ahead of free experience enhancements. The personalizations may be ranked just below the paid-for experiences or at the top of the listing 212. Other experiences (free enhancements) and so on may be ranked randomly or based on some subset of the initial ranking rules, and within each subset (such as paid-for experiences and personalizations), the rankings may be random or based on a subset of the ranking rules (e.g., rank higher priced experiences higher, rank a birthday or special day celebration ahead of other personalizations that may be provided to all such as those based on name or geographic origin).

In FIG. 2B, the experience state 220 indicates that the visitor has received their personalization experience 214, which was the top priority in the initialized listing 212. This may occur when the visitor is the only visitor eligible for such a personalization 214 at a venue or when they are selected based upon arbitration among others of a group by the event processor. The event processor may receive this historical information as feedback from the experience system at a particular venue in a destination. The historical information is used at FIG. 2C by the event processor to update the ranking of the personalizations/experiences for the visitor. As shown with updated experience state 230, the visitor now has a different entitlement listing or ranking 232 in which the personalization 214 that the visitor received is ranked lower than the enhanced experience 216.

The event processor may also act to update history for the personalized experience 214 to indicate the visitor has received this personalization, and this fact may later be used during an arbitration (e.g., the event processor may place a visitor with the birthday personalization who has not yet received this personalization ahead of the visitor associated with state 230). Such a feedback loop is a useful aspect of the method described herein as it is used to dynamically update individual rankings (that are later used in arbitrations) and provides an experience history (which can be mined for effectiveness of the managing process and/or used in arbitrations). Note, in some cases, an experience or personalization is only provided once (or some other predefined maximum number), and the event processor may, in such cases, delete the experience/personalization from the prioritized list (e.g., delete birthday personalization 214 from listing 232 because it has been received by the visitor).

In some instances, a group of visitors may be eligible for the same personalization/enhanced experience opportunity. The "group" may be a family or any arbitrary group of two or more visitors identified by provider of an experience/personalization. For example, a group of visitors may be in a single ride vehicle, and one (or a fixed number less than the number of the visitors in the group) personalization (such as calling out a name or home town) may be available for the vehicle as it passes a point along the ride path. The event processor may process the state management request and, based on business or group ranking rules (or arbitration rules), act to rank together all (or a subset of all) potential personalizations for all the visitors in the group. An event processor can then inspect the group ranking (or group's combined priority listing) and provide a requestor the determined order for distributing its personalizations/enhanced experiences. For example, the response to the requestor may provide the highest ranking prioritization supported at that location (which may not always simply be the highest entitlements in the ranking as high ranked items may not be available at this location).

Figure 3:
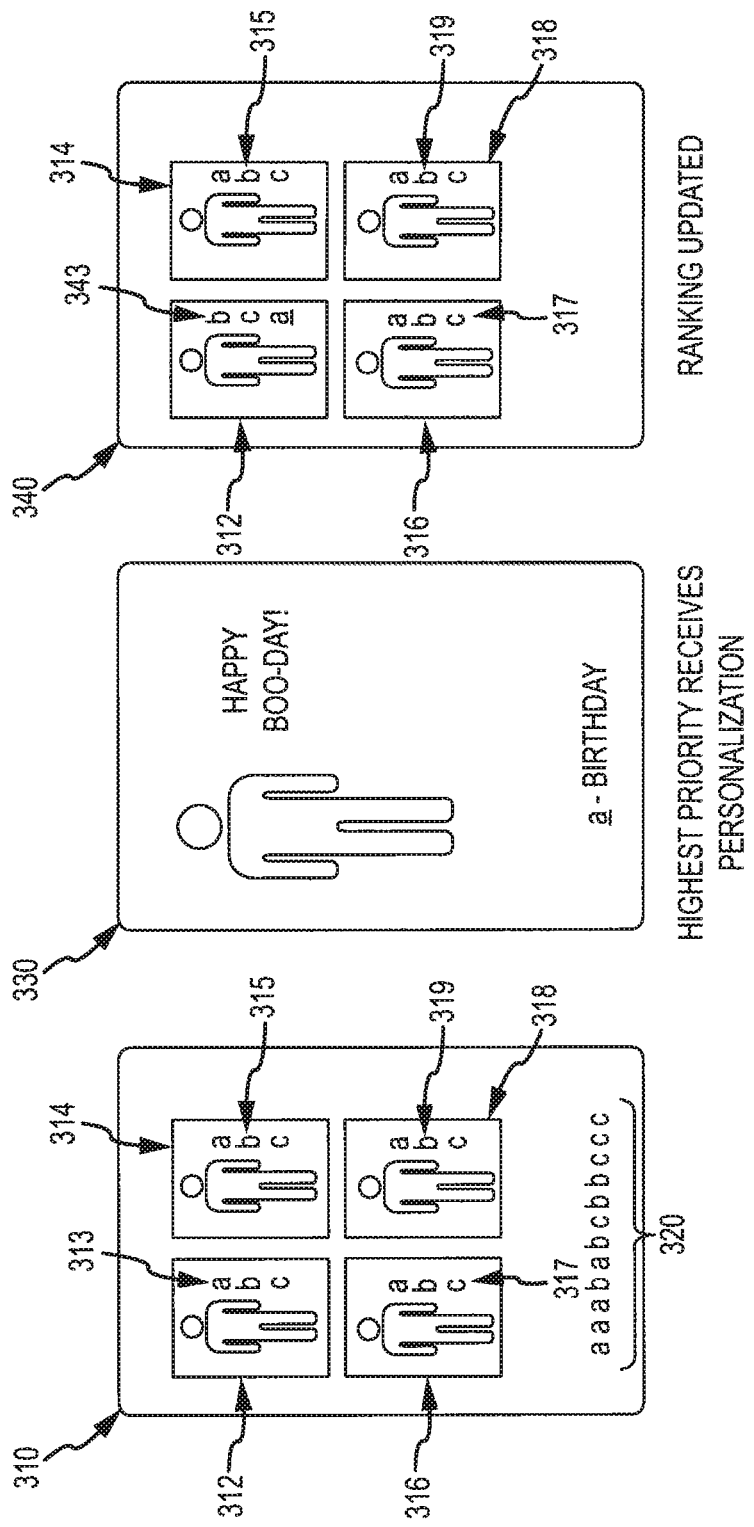
FIGS. 3A-3C schematically illustrate a group's experience state at various stages of an experience management process, such as may occur during management of personalization and enhanced experience access by a state management system such as the one shown in FIG. 1.

For example, FIG. 3A illustrates a managed group (or group experience state) of a number (four shown) of individual visitors. The event processor may retrieve the four individual managed experience states 312, 314, 316, 318 for the four identified visitors of the group 310, and, as shown, these include a ranking or prioritized listing 313, 315, 317, 319 for each of these visitors of their entitlements (e.g., what personalizations or enhanced experiences are they entitled to and what is their existing rankings for receipt). In this example, all four visitors have the same three entitlements ("a", "b", and "c"), which are ranked in the same order, but this often will not be the case as the listings 313, 315, 317, 319 may differ in makeup and order for each visitor visiting a destination.

The event processor in FIG. 3A has also managed the group state 310 to include a combined group ranking or prioritized listing 320 of all the individuals' listings. The group ranking 320 is compiled based upon a set of group ranking rules (business rules), which may vary to practice the invention. For example, the "a" experiences may generally be ranked ahead of the "b" experiences and the "b" experiences ahead of the "c" experiences based on some default rule (e.g., "a" may involve a paid-for experience, "b" may involve a personalization, and "c" may be a free enhanced experience). However, exceptions may be used to alter this rule such as moving the "b" experience for visitor 314 ahead of the "a" experience for visitor 318 such as because visitor 314 is a preferred visitor and visitor 318 has already received the "a" experience at least once.

The grouping of visitors within each arranged experience may also be based on a set of ranking rules applied by an event processor. For example, visitor 312 may receive the "a" experience ahead of visitor 316 for a number of reasons such as random selection, the amount they paid for their pass or to receive the experience, their age (younger or older visitors receive priority for different experiences), and so on. Again, the specific rules used are not limiting but the use of such rules and ranking of a group in combination is the more important aspect of this description.

FIG. 3B illustrates the individual state 330 of the visitor 312 showing that this visitor has received their "a" personalization (e.g. a personalized birthday announcement). In other words, the highest priority in the group for receiving the personalization (as identified by the response provided by the event processor). A feedback message is provided to the event processor indicating the occurrence of distribution/delivery of the personalization of FIG. 3B. As a result, each member of the managed group 340 has their individual experience state 312, 314, 316, 318 updated. Recipient visitor's state 312 is updated to change the ranking 343 such as to move experience/personalization "a" to the bottom of the listing (now a lower/lowest priority item because it has been received). Some other indication may also be stored that tracks actual receipt of the experience in state 312 (such as by increasing a received count by one).

The managed experience states 314, 316, 318 may not have their rankings 315, 317, 319 changed, but the missed opportunity may be tracked such as by increasing a missed "a" experience count by one for each of these three visitors. Such updated states 312, 314, 316, 318 would then result in a different group ranking list if the same group were to pass by an "a" experience/personalization offeror again (e.g., the visitor associated with managed state 312 likely would be positioned lower than the others, unless other tracked experiences occur in the meantime). The group ranking is typically not again determined (not reranked at state 340) until another managed experience state request is received as the group ranking determination (such as shown in FIG. 3A) is a point in time determination as the group's makeup may change over time, individual experience states may change over time, and so on.

Figure 4:
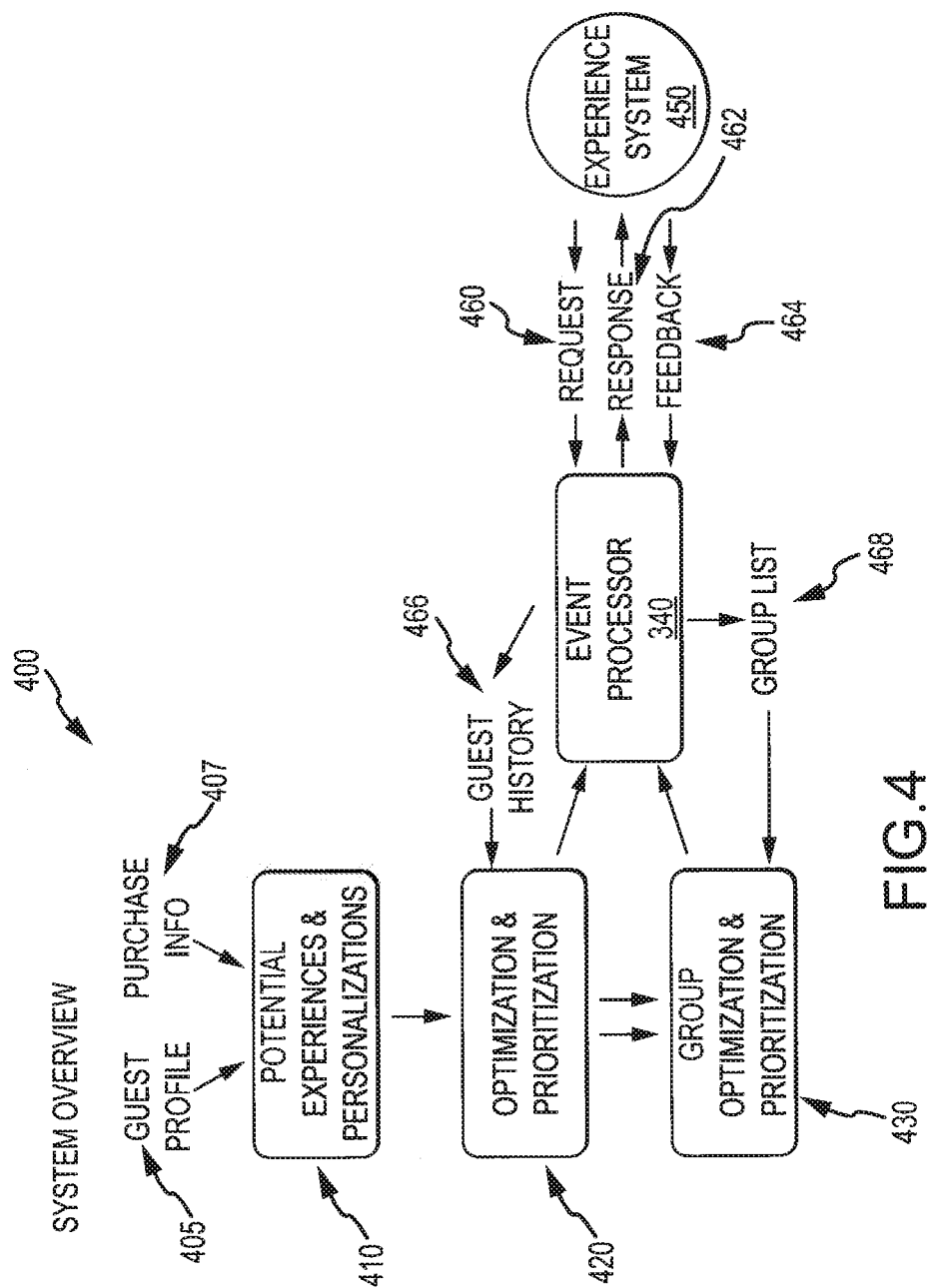
FIG. 4 illustrates a system overview of components used to manage experience state at a destination, such as an amusement park, showing processing steps/activities, communications and data flow among the components.

FIG. 4 illustrates schematically and logically a system overview 400 illustrating components of a system for managing experience states, processing performed during system operation (during performance of the experience management method), and communications/messages between the various components of the system. As shown, the system takes in a guest profile 405 along with purchase information 407 and generates at 410 a listing of entitlements for the guests or a list of all potential enhancement experiences and personalized experiences that the guest is eligible to receive during their visit. For example, all guests of a theme park under the age of 10 that are girls may be eligible for a princess experience, all guests that purchased a birthday personalization may be eligible for birthday personalization, all guests may be eligible for a geographic origin-based personalization, and so on.

The event processor 440 may act to process this listing based on business rules and a guest history 466 (if any available, yet) to prioritize and optimize the entitlements to generate at 420 an individual experience/personalization ranking or prioritized listing. The guest history may be used in such processing 420. For example, the guest may have made prior visits in which they have already had some of the available experiences, and this information may be used to lower the rankings of these experiences. The history may be a survey provided by the guest indicating their preferences for the various experiences (e.g., their own ranking information may be used to create an initial ranked list).

An experience system 450, such as a device or station at an attraction or associated with a ride or the like, may request 460 information from the event processor 440. This request 460 may include IDs for one or more guests, which allows the event processor 440 to retrieve the experience ranking or prioritized list for the identified guests. The request 460 may also include a list of available personalizations/enhanced experiences at that location or provided by the experience system 450. The event processor 440 acts to process the request 460 and generates a response 462 indicating which guests should receive the offered personalization(s)/experience(s) and/or in which order.

If the request is for a single guest, business rules may be applied by the event processor for the identified guest and a response 462 is provided indicating whether or not the guest is allowed to receive the personalization/experience and when useful providing personalization information from their profile 405. For example, the business rules may simply require confirmation that the guest is eligible for the personalization or experience offered by the experience system. Feedback 464 is then provided by the experience system 450 to the event processor 440, and the event processor 440 updates the guest's history 466 (e.g., indicating they received one or more personalizations/experiences) and creates an updated ranking or prioritized listing (e.g., moves the received entitlements down to a lower ranked position).

If a request 460 is for (or identifies) a group of two or more guests, the group's individual prioritized lists are processed or generated at 430 by the event processor 440 to provide a single group prioritized list or group ranking for the personalizations/experiences. The business rules are applied at 430 by the event processor 440 to the first initial combination, and this may be performed as discussed with reference to FIGS. 3A-3C. The generated experience/personalization listing is then returned as a response 462 to the experience system 450 for use in selecting one, two, or more guests to receive one or more experiences/personalizations (and in which order the guests will receive these experiences (e.g., sequentially based on the ranked lists or concurrently for some personalizations/ experiences such as displaying more than one name or image on a display). Feedback 464 is then provided by the experience system 450 to the event processor 440 (e.g., which guests actually receive which experiences/personalizations), and the event processor 440 updates the guest history 466 and, when applicable, each individual guest's experience state (reranking, increasing received/missed counts, and so on).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As will be appreciated, the experience state management method described herein provides a technique for effectively managing the scarce resource of opportunities to provide personalized or enhanced experiences to visitors or guests of a destination (such as a theme park). The management may be across the visitor's overall park experience such as over a whole day or over two or more days and even over two or more facilities that are associated to more broadly define "destination" (e.g., two theme parks may share single guest profile and history such that a guest that receives or does not receive a personalization/experience at one facility may have this history used when visiting another facility so as to more fairly distribute these opportunities). The method provides a way to level the playing field when compared to purely random systems where one visitor may receive more than one experience before others receive their first or where a visitor that is at a facility for multiple days may be passed over for a new arrival.

The techniques for initially ranking an individual's experiences/personalizations may vary widely to practice the invention and may be performed based on complex business rules. Likewise, the techniques used to arbitrate among individuals on a team or in a group may also be varied to practice the described state management. Generally, the individual rankings and personal history will be used to arbitrate among group members (or between two visitors competing for a scarce resource). Other "tiebreakers" or weighting factors for ranking the individuals in a group, when the rankings are identical, may include: how long the individual has been at the destination, a random selection algorithm, age of the individuals (e.g., place targeted age groups for a theme park or event ahead of others in the group), and/or a value score (e.g., a customer may have a higher score if they are a valued customer for a number of reasons such as repeat visitor, the person paying for the visit for others, and so on).

The method may include steps for mining the historical tracked experience data. The feedback loops described herein allow the system to track how many and which visitors received which personalizations and experiences. This allows learning to occur, which may allow automated or manual changes to the business rules to be implemented to enhance operation of the experience state management system. Additionally, the method may include proactive processing of the data to discover when particular visitors do not receive predefined personalization/experiences, and corrective steps may then be taken to address the problem. For example, a customer may pay for the right to receive a particular enhanced experience but, due to certain factors (such as large crowds or the like), the customer may miss their opportunities (others were selected by the event processor to receive the experience). In such a case, an alert may be transmitted to an operator (or other portion of the system), and the operator can trigger a response such as transmitting a gift to the customer (e.g., a coupon to have this experience guaranteed on their next visit, a coupon providing a free pass, merchandise, or the like).

The above examples and description stress that rankings may be pre-calculated or determined and stored in memory for later accessing to determine which customer or visitor will be given a next experience. However, it should be clear that the ranking and/or prioritization may, instead, be done on demand (such as by the event processor) such that this information is generated in real time as needed rather than being stored in memory for later retrieval.

We claim:

1. A computer program product including non-transitory computer useable medium and computer readable code embodied on the non-transitory computer useable medium for managing distribution of entitlements, such as personalized or enhanced experiences at a destination, the computer readable code comprising:
computer readable program code adapted to cause a computer to effect receiving a request for experience state management services from an experience system, the request defining an experience provided by the experience system and an identifier for a visitor;
computer readable program code adapted to cause the computer to effect accessing from memory an experience state, associated with the identified visitor, including a set of eligible experiences and a ranked order for receiving the eligible experiences;
computer readable program code adapted to cause the computer to effect generating a response to the experience system indicating whether the visitor is eligible to receive the defined experience based on the set of eligible experiences in the experience state and the ranked order for receiving the eligible experiences; and
computer readable program code adapted to cause the computer to effect, in response to feedback relative to distribution of the defined experience to the visitor, updating the experience state to modify the ranked order, wherein the modifying of the ranked order comprises lowering a ranking of the defined experience relative to other experiences in the set of eligible experiences when the feedback indicates the defined experience was distributed to the visitor.

2. The computer program product of claim 1, wherein the operating of the event processor to update the experience state further includes updating an experience history to increase a count of a number of times the visitor has received the defined experience and wherein the generating of the response to the experience system is performed based on the count of the number of time the visitor has received the defined experience.

3. The computer program product of claim 1, wherein the modifying of the ranked order comprise providing a historical indication that the visitor missed an opportunity to receive the defined experience when the feedback indicates the defined experience was not distributed to the visitor and wherein the generating of the response to the experience system is performed based on the historical indication that the visitor missed an opportunity to received the defined experience.

4. The computer program product of claim 1, wherein the request further provides an identifier for a second visitor, wherein the computer readable code further includes computer readable program code adapted to cause the computer to effect accessing an experience state for the second visitor including a set of eligible experiences and a ranked order for the set of eligible experiences for the second visitor, and wherein the generating of the response includes arbitrating between the first and second visitors to select a recipient for the defined experience.

5. The computer program product of claim 4, wherein the arbitrating is performed based on comparing the ranked orders such that the selected recipient had the defined experience as a higher priority experience.

6. The computer program product of claim 4, wherein the arbitrating is performed based on a set of business rules when the defined experience is equally ranked in the ranked orders.

7. The computer program product of claim 6, wherein the set of business rules includes selecting a visitor among visitors equally ranking an experience that has an experience history indicating a lower number of times receiving the defined experience.

8. A method for managing distribution of experiences to groups, comprising:
initializing a plurality of profile records stored in memory and each associated with a visitor of a facility with at least one experience-generating system and each including a prioritized set of experiences for which the associated visitor is eligible;
with an event processor run by a processor, receiving a request from an experience-generating system that includes identifiers for a group of two or more of the visitors;
with the event processor, determining a combined prioritized list of experiences including an experience provided by the experience-generating system for the visitors in the group and storing the combined prioritized list of experiences in memory; and
with the event processor, providing a response to the experience-generating system based on the combined prioritized list of experiences, whereby an order of the visitors in the group is defined for receiving the experience provided by the experience-generating system.

9. The method of claim 8, wherein the determining of the combined prioritized list of experiences is performed by applying a set of business rules.

10. The method of claim 9, wherein one of the business rules involves determining which of the visitors is designated as a preferred customer and ranking the visitors determined to be preferred higher in the combined prioritized list of experiences.

11. The method of claim 8, further including, after the providing step, receiving a feedback message defining a set of the visitors receiving the defined experience and, in response, updating the prioritized set of experiences for the set of visitors receiving the defined experience so as to lower a ranking of the received experience.

12. The method of claim 11, further including determining a set of the visitors that did not receive the defined experience from the requesting experience-generating system and, in response, updating a history for the non-receiving visitors to increase a count tracking missed opportunities for the defined experience.

13. A system for managing experience states to facilitate distribution of opportunities for experiences at a destination, comprising:
 a number of experience systems each comprising a visitor identification mechanism and an experience generator;
 memory storing a plurality of experience state records each associated with a visitor and including a listing of experiences at the destination for which the visitor is eligible; and
 an event processor operating to:
  receive a request from one of the experience systems that includes an identifier of one of the visitors from the visitor identification mechanism;
  access one of the experience state records associated with the identifier to determine if an experience provided by the requesting one of the experience systems is one of the eligible experiences on the listing; and
  when determined to be one of the eligible experiences, providing a response to the requesting one of the experience systems to proceed with providing the experience,
 wherein the request further includes a second identifier associated with a second one of the visitors and wherein the event processor further functions to arbitrate between the two identified visitors by generating or retrieving from memory and then comparing ranked listings associated with the two identified visitors and identifying one of the two identified visitors in the response to receive the experience.

14. The system of claim 13, wherein the listing is a ranked listing generated by the event processor and wherein the event processor further operates to receive a feedback communication from the one of the experience systems indicating that the experience was provided to the identified one of the visitors and to update the listing of the identified one of the visitors to lower a priority of the experience in the ranked listing.

15. The system of claim 14, wherein the event processor further operates to update a history of the identified one of the visitors in the experience state records to indicate receipt of the experience.

16. The system of claim 13, wherein the arbitrating includes choosing the identified one of the two visitors as one with a higher ranking of the experience in the two ranked listings and, when no higher ranking is determined, applying a set of business rules to the experience state records to find the identified one of the visitors for receiving the experience.

17. The system of claim 13, further comprising a profile generation module operating to generate the listing for the experience state records to prioritize the experiences by applying a set of business rules to the experiences for which each of the visitors, whereby the eligible experiences are ranked in a preferred order for distribution to each of the visitors.

18. The systems of claim 17, wherein the set of business rules includes ranking personalization experiences ahead of enhanced experiences and ranking paid-for ones of the enhanced experiences ahead of unpaid-for ones of the enhanced experiences.

* * * * *